Patented May 7, 1935

2,000,135

UNITED STATES PATENT OFFICE 2,000,135

PIGMENT

Friedrich August Henglein, Cologne-Deutz, and Oswin Nitzschke, Leverkusen-I. G. Werk, Germany, assignors to I. G. Farbenindustrie Aktiengesellschaft, Frankfort-on-the-Main, Germany No Drawing. Application December 23, 1932, Serial No. 648,723. In Germany January 13, 1932

4 Claims. (Cl. 134—58)

The present invention relates to pigments being composed of chromium oxide and alkaline-earth metal sulfate in a fixed proportion, and to a process of preparing the same.

In accordance with the present invention it has been found that very valuable green pigments are obtained when reacting at elevated temperature upon an alkaline-earth metal chromate or bichromate with a gas containing sulfur dioxide or sulfur trioxide; all alkaline-earth metal mono- or bi-chromates such as calcium, strontium and barium mono- and bichromates come into consideration. The reaction proceeds according to one of the following equations:

$MeCr_2O_7 + SO_3 = MeSO_4 + Cr_2O_3 + 3\ O$
$MeCr_2O_7 + SO_2 = MeSO_4 + Cr_2O_3 + 2\ O$
$2\ MeCrO_4 + 2SO_3 = 2\ MeSO_4 + Cr_2O_3 + 3\ O$
$2\ MeCrO_4 + 2SO_2 = 2\ MeSO_4 + Cr_2O_3 + O$ (Me standing for Ca, Sr, Ba.)

According to this process products are obtained which display a much purer and greener shade than additional mixtures of chromoxide green with the corresponding alkaline-earth metal sulfates.

A further advantage of the process is the very simple working method. The alkaline-earth metal chromate is heated to a temperature of 700–1300° C. for instance in a revolving furnace through which gases containing $SO_2$ or $SO_3$ are passed. The product on leaving the furnace does not require any after-treatment and can directly be used for painting.

The invention is further illustrated by the following example without being restricted thereto:—

*Example*

Into a revolving furnace which is heated to 1150° C. barium mono-chromate is gradually introduced so that it passes slowly through the furnace to the lower part of the same. At this lower end the gases obtained from roasting, that is to say gases containing $SO_2$ are introduced into the tube in counter-current to the barium mono-chromate in order to leave the tube at the upper end. The mixture obtained, being composed of 2 mols of $BaSO_4$ together with 1 mol of $Cr_2O_3$, does not require any after-treatment for the use as pigment.

The same product is obtained when taking, instead of gases obtained from roasting, gases containing $SO_3$. When starting with barium bichromate instead of with mono-chromate a product of the following composition is obtained:

1 mol of $BaSO_4$ to 1 mol of $Cr_2O_3$, which is equally well suitable as a pigment.

We claim:—

1. Process for preparing green pigments consisting in heating an alkaline-earth metal chromate to a temperature of 700–1300° C. in an atmosphere containing $SO_y$, $y$ standing for 2 or 3.

2. Process for preparing green pigments consisting in heating a barium chromate to a temperature of 700–1300° C. in an atmosphere containing $SO_y$, $y$ standing for 2 or 3.

3. Process for preparing green pigments consisting in heating a barium chromate to a temperature of 700–1300° C. in an atmosphere containing $SO_2$.

4. Process for preparing green pigments consisting in heating a barium chromate to a temperature of 700–1300° C. in an atmosphere containing $SO_3$.

FRIEDRICH AUGUST HENGLEIN.
OSWIN NITZSCHKE.